Sept. 5, 1944.   J. P. RUGHEIMER   2,357,690

SWITCH CONTROL FOR DRILL PRESSES

Filed April 29, 1943

John P. Rugheimer
Inventor

By  Paul Eaton
Attorney

Patented Sept. 5, 1944

2,357,690

UNITED STATES PATENT OFFICE 2,357,690

SWITCH CONTROL FOR DRILL PRESSES

John P. Rugheimer, Charleston, S. C.

Application April 29, 1943, Serial No. 484,979

1 Claim. (Cl. 77—6)

This invention relates to a drill press and more especially to handy means whereby the motor driving the drill can be quickly deenergized by the hand of the operator which is engaged in feeding the drill to the work.

In conventional drill presses, there is usually a vertically disposed drill and a vertically adjustable platform for supporting a workpiece which is being drilled. The drill is raised and lowered by means of a rotatable shaft having one or more handles thereon and by rotating this shaft, the drill shaft having the drilling bit therein is raised or lowered, and the left hand of the operator is usually employed in holding the workpiece on the platform while the right hand of the operator is engaged in feeding the drill bit to the work. When it is desired to stop the drill, as for example when the drill bit might get hung in the work, or not operate satisfactorily, and where it is difficult to withdraw the drill from the work, heretofore one of the hands of the operator had to release the drill bit feeding handle of the machine or the workpiece and reach for a switch located somewhere on the drill press for cutting off the switch and stopping the motor. If the hand holding the workpiece should be released from the workpiece in order to turn the switch, the workpiece is liable to change position, resulting not only in damage to the drill but also in damage to the workpiece.

Usually the switch on a drill press is located on the left-hand side of the press or on the wall adjacent the press, and the left hand of the operator which is normally holding the workpiece has to release the workpiece and turn off the switch.

It is an object of this invention to provide a switch for controlling the motor, which switch can be controlled by one or more of the handles extending from the shaft which feed the drill to the workpiece. Some drill presses have one handle, some two, some three, and some as high as five or six, and the handle projecting toward the operator which is most convenient for the operator to seize is the one which is seized by the operator for feeding the drill bit to the work or withdrawing the drill bit from the work.

It is another object of this invention to provide means controlled by the feeding mechanism of a drill press whereby the motor driving the drill bit of the drill press can be energized or de-energized without either hand of the operator being removed from the task assigned to it in the operation of the drill press.

Some of the objects of the invention having been stated, other objects will appear as the description proceeds when taken in connection with the accompanying drawing, in which.

Figure 1:
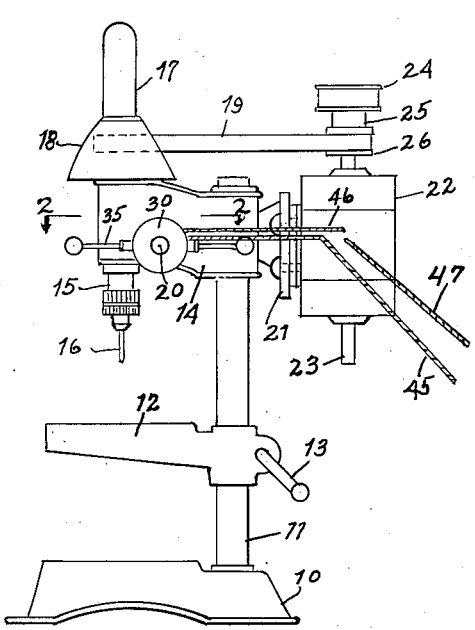
Figure 1 is a side elevation of a drill press showing my invention associated therewith.

Referring more specifically to the drawing, the numeral 10 indicates the base piece of a drill press which has extending upwardly therefrom a standard 11 and adjustably mounted on this standard is a work supporting platform 12 which can be adjusted vertically of the standard 11 by means of a threaded lever 13 penetrating the two portions of the platform which surrounds the standard 11, this hub portion of the work supporting platform being slit in a conventional manner although it is not shown in the drawing. Secured on the upper end of the standard 11 is a bracket 14 which has vertically mounted therein a drill bit shaft 15 having a drill bit 16 therein, and this shaft 15 extends vertically through the member 14 and into portion 17 extending thereabove. A shield 18 is associated with the member 14 and within this shield a pulley, not shown, on shaft 15 has mounted thereon a belt 19. The shaft 15 has a conventional rack, not shown, which is engaged by a pinion, not shown, on a transversely disposed shaft 20, and the rotation of the shaft 20 causes raising and lowering of the shaft 15 in a conventional manner.

Also supported by member 14 is a bracket 21 which has mounted thereon an electric motor 22 having a shaft 23 provided with a plurality of pulleys 24, 25, and 26, the shaft 23 being vertically adjustable in the motor in a conventional manner, not shown. The belt 19 is adapted to be mounted on one of these pulleys 24, 25, or 26 to thereby give the desired speed to the drill shaft 15.

The shaft 20 has fixedly secured thereon a hub 30 by any suitable means such as the shaft being shouldered and squared as at 31 and the hub having a hole corresponding to the portion 31 fitting over portion 31, and a nut 32 is adapted to be threadably secured on the end of the shaft to hold the hub in fixed position. The hub has mounted therein in any suitable manner, such as by threading, sleeves 33 in which are rotatably mounted handle members 34 and 35, these handle members being removably confined within the sleeve 33 by any suitable means such as collars 36. The knobs 34a and 35a on the handles are removable to permit assembly of the mechanism. The shaft 20 has slidably mounted thereon a sleeve 37 which has a pair of continuous radial grooves 38 and 39 therein. The handle members 34 and 35 have offset or crank portions 40 and 41 thereon which are adapted to loosely fit in the grooves 39.

Figure 2:
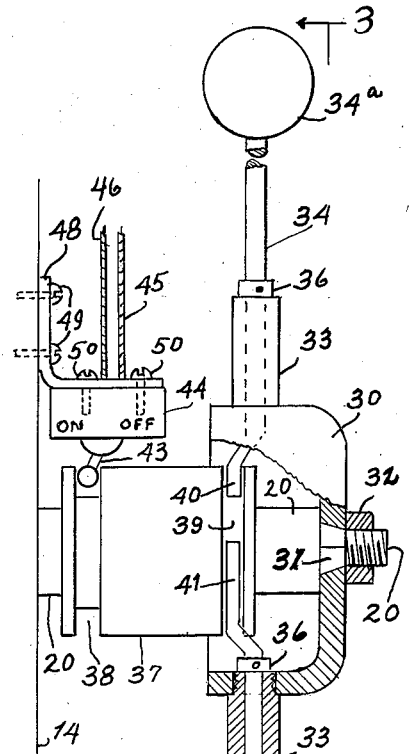
Figure 2 is a vertical plan view with parts of the apparatus being broken away for better illustration and showing my switch operating means associated therewith, and taken along the line 2—2 in Figure 1.
Figure 3:
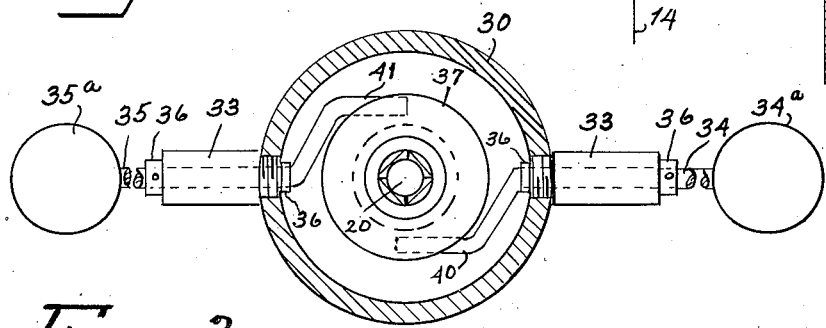
Figure 3 is a view, partly in section, taken along the line 3—3 in Figure 2.

The groove 38 has adapted to fit therein a lever 43 of a toggle switch mechanism 44. It is therefore seen that in the position shown in Figure 2, the handle nearest the operator being rotated in a counter-clockwise motion by the operator, has moved the sleeve to the left and therefore has moved the switch to the "on" position as shown in Figure 2. It is quite evident that by a clockwise rotative motion being imparted to handle 35, that the sleeve would be moved to the right in Figure 2, and thus move the toggle switch mechanism to "off" position.

The wiring for the motor, instead of going to a conventional switch mounted adjacent the drill press, comprises a wire 45 which leads directly to the toggle switch mechanism 44. A wire 46 leads from the toggle switch mechanism to the windings of the motor, and from the motor a wire 47 leads to a suitable source of electrical energy. Therefore, it is seen that by rotating one of the handles a partial revolution, it will move the switch from on to off position or vice versa.

The toggle switch mechanism 44 may be mounted by any suitable means such as an angle bracket 48 being secured by means of screws 49 to the member 14, and the other leg of the angle bracket has screws 50 which penetrate a portion of the toggle switch housing 44 to secure the toggle switch mechanism in the position shown.

In the drawing and specification, there has been set forth a preferred embodiment of the invention and although specific terms are employed, they are used in a generic and descriptive sense only and not for the purpose of limitation, the scope of the invention being defined in the claim.

I claim:

In a drill press having a work supporting means and a vertically movable socket member for carrying a drill bit and a transversely disposed shaft having engagement with the socket member whereby rotation of the shaft will raise or lower the socket member, and also having an electric motor connected to the socket member for imparting rotation to the same, a circuit for said motor having a switch disposed therein, a hub member fixedly mounted on the transversely disposed shaft, a sleeve member mounted for sliding movement on said shaft, a lever for said switch, a peripherial groove in said sleeve into which the switch lever protrudes, a second radial groove in said sleeve, a radially disposed handle member rotatably mounted in said hub for rotation about its longitudinal axis, and having a crank portion fitting into the second radial groove, whereby rotation of the handle member in its hub will move the sleeve to actuate the switch.

JOHN P. RUGHEIMER.